March 16, 1965

H. W. DIETERT 3,173,725

PNEUMATIC CONVEYOR STRUCTURE

Original Filed Feb. 18, 1963

INVENTOR.
HARRY W. DIETERT
BY Whittemore,
Hulbert & Belknap
ATTORNEYS

United States Patent Office 3,173,725
Patented Mar. 16, 1965

3,173,725
PNEUMATIC CONVEYOR STRUCTURE
Harry Walter Dietert, Kerrville, Tex., assignor to Harry W. Dietert Co., Detroit, Mich., a corporation of Michigan
Original application Feb. 18, 1963, Ser. No. 259,069. Divided and this application Aug. 3, 1964, Ser. No. 386,874
4 Claims. (Cl. 302—53)

The invention relates to material handling apparatus and refers more specifically to pneumatic conveyor structure for transferring powdered material between predetermined locations.

This application is a division of application, Serial No. 259,069, filed February 18, 1963.

In the past powdered material, such as bonding agents for foundry granular material, has been packaged in sacks which have been hand opened and emptied at the point of use of the bonding agent. Due to the large amounts of dust created by such an operation, efficiency dictates that the sacks be opened at a location remote from the point of use of the powdered material and the material subsequently transported to the location of use thereof.

It is therefore an object of the present invention to provide improved apparatus for transporting powdered material from one location to another.

Another object is to provide pneumatic conveyor structure for transferring powdered material from one location to another.

Another object is to provide structure for transferring powdered material from one location to another including a storage tank for the powdered material, a discharge conduit extending from the storage tank to the location to which it is desired to transfer the powdered material from the storage tank, means for sealing the storage tank with powdered material therein, and means for passing air under pressure into the storage tank.

Another object is to provide pneumatic conveyor structure as set forth above and further including a filter extending over a substantial area of the tank between the means for passing air into the tank and the powdered material in the tank.

Another object is to provide pneumatic conveyor structure as set forth above wherein the means for introducing air into the tank comprises a manifold secured to the exterior of the tank and openings between the tank and manifold.

Another object is to provide pneumatic conveyor structure as set forth above wherein the means for sealing the tank comprises a valved opening in the tank through which powdered material may be placed in the tank.

Another object is to provide pneumatic conveyor structure as set forth above wherein one end of the conduit is positioned adjacent the bottom of the tank and the conduit extends to the tank at the side thereof at approximately thirty degrees thereto.

Another object is to provide pneumatic conveyor structure as set forth above wherein the tank has a conical bottom tapering to a narrow outlet opening and one end of the conduit is secured to the narrow outlet opening.

Another object is to provide pneumatic conveyor structure which is simple in construction, economical to manufacture and efficient in use.

Other objects and features of the invention will become apparent as the description proceeds, especially when taken in conjunction with the accompanying drawings, illustrating preferred embodiments of the invention, wherein.

Figures 1, 2, 3:
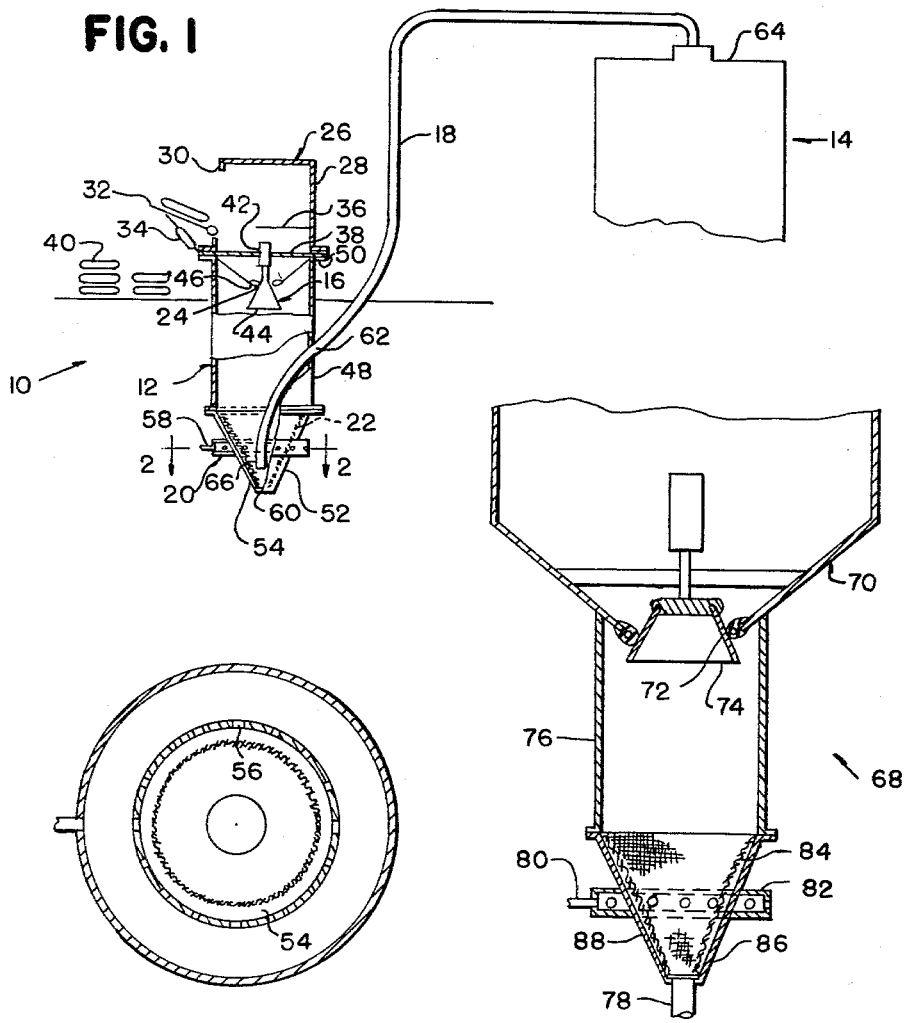
FIGURE 1 is a diagrammatic elevation view, partly broken away, of pneumatic conveyor structure constructed in accordance with the invention.
FIGURE 2 is an enlarged cross section view of a portion of the pneumatic conveyor structure illustrated in FIGURE 1 taken substantially on the line 2—2 in FIGURE 1.
FIGURE 3 is a longitudinal section view of a modification of the pneumatic conveyor apparatus illustrated in FIGURE 1.

With particular reference to the figures of the drawing, one embodiment of the present invention will now be considered in detail.

As shown best in FIGURE 1, the pneumatic conveyor structure 10 includes the tank 12 for receiving powdered material to be transferred to storage bin 14, sealing structure 16 for sealing tank 12 as desired, conduit 18 extending between tank 12 and storage bin 14, and manifold 20 for introducing air into the tank 12 through filter 22.

In operation powdered material is passed through the open sealing structure 16 into the tank 12. The sealing structure 16 is then actuated to seal the tank 12, after which air under pressure is admitted through manifold 20 and filter 22 into the tank 12. The powdered material is drawn through the conduit 18 along with air under pressure into bin 14 to transport the powdered material between the tank 12 and the bin 14.

More specifically powdered material, such as Hygeria wood flour, Sea Coal or Bentonite which are bonding agent additives for foundry granular material, is positioned in the tank 12 through opening 24 in the automatic sack opening structure 26. Sack opening structure 26 is considered in greater detail in the above referenced copending patent application. Briefly, the sack opening structure 26 includes a housing 28 having opening 30 in the side thereof, door 32 for opening 30 actuated by piston and cylinder structure 34, knife means 36 and grate 38 extending transversely of the housing 28.

In operation a sack 40 of powdered material is positioned on door 32 in the open position and the door 32 is closed by actuation of piston and cylinder structure 34 in the usual manner. The sack 40 of powdered material is thus thrown on the knife 36 and is split open. The portions of the sack 40 are retained on grate 38 so that they may be removed from the housing 28 on opening of the door 32. The powdered material passes through the grate 38 and opening 24 in housing 28 into the tank 12 with the sealing structure 16 in an open position.

Sealing structure 16 includes the actuating piston and cylinder structure 42 which may be supported by grate 38 as shown or by housing 28, the conical valve 44 secured to the piston and cylinder structure 42 and the annular sealing ring 46 positioned around the periphery of the opening 24. The piston and cylinder structure 42 may be conceniently pneumatically actuated as will be understood by those in the art in accordance with the operating sequence of the pneumatic conveyor structure 10 which will be set forth subsequently in consideration of the over-all operation of the apparatus 10.

Tank 12, as shown best in FIGURE 1, includes the cylindrical upper portion 48 secured to the housing 28 about flanges 50 and the conical lower portion 52. The filter 22 is secured in the conical portion 52 of tank 48 and provides an inner lining therefor, whereby in operation a plenum chamber 54 is provided between the conical portion 52 of tank 12 and powdered material positioned therein. The filter 22 may be of any desired flexible permeable material, such as canvas, metal cloth and the like.

The manifold 20 for introducing air into the tank 12 is a hollow annular structure, as shown best in FIGURE 2. Openings 56 are provided through the conical portion 52 of tank 12 at the inner periphery of the hollow annular structure through which air in the manifold 20 is passed into the plenum chamber 54 between the filter 22 and the conical portion of the tank 12. A connection 58 into the manifold 20 from a convenient source of air under pressure is provided.

Conduit 18, as shown in FIGURE 1, is rigid and extends from the bottom 60 of the conical portion 52 of tank 12 out through opening 62 in tank 12 to the top 64 of storage bin 14. The conduit 18 is curved gradually and makes an angle of approximately thirty degrees with the tank 12 as it passes through the tank 12 to enhance the flow characteristics of the powdered material from the tank 12 through the conduit 18 to the storage bin 14.

Thus in over-all operation with the valve 44 down or in an open position a sack of flowable powdered material, such as a bonding agent for foundry granular material, is positioned on the open door 32 and the door 32 is closed causing the sack 40 to be split open on knife 36, whereby the powdered material passes through the opening 24 into tank 48. The door 32 is then opened, the split sack removed and the operation is repeated until a desired quantity of powdered material is in the tank 12.

The valve 44 is then closed by convenient switching apparatus (not shown), after which air under pressure is admitted into the manifold structure 20 through inlet 58 from a source of air (not shown). The air then passes through openings 56 and into the plenum chamber 54 between filter 22 and the conical portion 52 of tank 12. The air filters through the filter 22 and is thus disbursed through the powdered material in the conical section 52 of the tank 12. The air from manifold 20 thus does not tend to form direct paths from the openings 56 to the end 66 of conduit 18. The powdered material in the tank 48 is thus fluidized and caused to pass into the end 66 of conduit 18 along with the air from manifold 20 and is carried through conduit 18 to the storage bin 14. The air is then allowed to escape from the storage bin 14, leaving the powdered material which has been transferred from the tank 12 in the bin 14.

It will be readily recognized that the transfer of powdered material from the tank 12 to the storage bin 14 has been dust free. Further the structure 10 is particularly simple in construction, economical to manufacture and efficient in use.

The modified pneumatic conveyor structure 68 illustrated in FIGURE 3 is similar to the pneumatic conveyor structure 10 illustrated in FIGURE 1 in that powdered material passes from the automatic sack opening structure 70 which is more fully set forth in the above referenced copending patent application through the opening 72 with the sealing structure 74 open into the tank 76. The powdered material is then transferred out of the tank 76 through the conduit 78 by means of air under pressure passed into the tank 76 from a source of air 80 (not shown) passing through manifold 82 and filter 84 with the sealing structure 74 closed as before.

The flow of powdered material from the modified pneumatic conveyor structure 68 is enhanced however since the conduit 78 is secured to the smaller end 86 of the conical portion 88 of tank 76.

While one embodiment of the present invention and a single modification thereof have been considered in detail, it will be understood that other embodiments and modifications thereof are contemplated. It is the intention to include all embodiments and modifications of the disclosed invention as are defined by the appended claims within the scope of the invention.

What I claim as my invention is:

1. Means for transferring powdered material from one location to another comprising a tank including an upper cylindrical portion and a lower inverted frusto-conical portion having an altitude greater than the diameter of the base thereof, a valve opening in the upper end of the cylindrical portion of the tank through which powdered material may be passed into the tank, valve means for selectively closing said valve opening including a rubber-like sealing member around the periphery of the valve opening, a frusto-conical valve member having a smaller diameter end extending out of the tank through the valve opening and a larger diameter end within the tank and means for urging the valve member out of the tank, an annular manifold positioned centrally of the altitude of the frusto-conical portion of said tank, openings in said frusto-conical portion of said tank extending between the tank and the annular manifold, means for passing air under pressure into the manifold, a flexible frusto-conical filter member having concave sides having a larger diameter end connected at the junction between the frusto-conical portion and cylindrical portion of said tank and a smaller diameter end connected at the smaller diameter end of the frusto-conical portion of said tank for producing a plenum chamber between the frusto-conical portion of the tank and the filter member on introduction of air into the air manifold under pressure and a conduit extending out of the tank from the smaller diameter end of the frusto-conical portion of the tank through which the powdered material is carried from the tank on introduction of air into the plenum chamber from the manifold.

2. Structure as set forth in claim 1 wherein the filter member is a metal cloth.

3. Structure as set forth in claim 2 wherein the conduit extends upwardly from the smaller end of the frusto-conical portion of the tank and out of the side of the cylindrical portion of the tank and the conduit is gradually curved as it extends out of the tank at an angle of substantially thirty degrees with respect thereto.

4. Structure as set forth in claim 2 wherein one end of the conduit is connected directly to the smaller diameter end of the frusto-conical portion of the tank.

References Cited by the Examiner
UNITED STATES PATENTS

| | | | |
|---|---|---|---|
| 2,102,112 | 12/37 | Costello | 302—53 |
| 2,221,741 | 11/40 | Vogel-Jorgensen | 302—53 |
| 2,897,009 | 7/59 | Gianniny | 302—29 |
| 2,924,489 | 2/60 | Beckmann | 302—29 |

FOREIGN PATENTS 709,265   5/54   Great Britain.

SAMUEL F. COLEMAN, *Primary Examiner.*

ANDRES H. NIELSEN, *Examiner.*